United States Patent [19]

Jessop

[11] 4,270,624
[45] Jun. 2, 1981

[54] STEERING COLUMN LOCK INHIBITOR FOR A FLOOR MOUNTED TRANSMISSION CONTROL

[75] Inventor: Michael E. Jessop, Saginaw, Mich.

[73] Assignee: General Motors Corporation, Detroit, Mich.

[21] Appl. No.: 56,776

[22] Filed: Jul. 11, 1979

[51] Int. Cl.³ .............................................. B60R 25/02
[52] U.S. Cl. ...................................... 180/287; 70/252
[58] Field of Search ................. 70/238, 239, 248, 247, 70/245, 250, 251, 252, 237; 180/287, 271

[56] References Cited

U.S. PATENT DOCUMENTS

| 3,490,255 | 1/1970 | Wight et al. | 70/252 |
| 3,572,067 | 3/1971 | Kimberlin et al. | 70/252 |
| 3,590,613 | 7/1971 | Kimberlin et al. | 70/239 |
| 3,859,828 | 1/1975 | Ibuka et al. | 70/252 |
| 4,029,168 | 6/1977 | Kramer | 180/287 |

Primary Examiner—John P. Silverstrim
Assistant Examiner—Milton L. Smith
Attorney, Agent, or Firm—Donald F. Scherer

[57] ABSTRACT

A lock inhibitor for a steering column has a flexible cable connected with a manually operated floor mounted transmission control mechanism. The transmission control must be manually moved to the "Park" position before the lock inhibitor can be moved manually to a position which will permit the ignition key to be rotated to the "Lock" position when the key is removed.

3 Claims, 4 Drawing Figures

STEERING COLUMN LOCK INHIBITOR FOR A FLOOR MOUNTED TRANSMISSION CONTROL

This invention relates to ignition lock inhibitors and more particularly to ignition lock inhibitors which require the transmission control mechanism to be in the "Park" position before the inhibitor can be actuated.

There are prior art steering column lock inhibitors such as those shown in U.S. Pat. No. 3,572,067 to Kimberlin et al and U.S. Pat. No. 4,029,168 issued to Kramer, both of which are assigned to the assignee of this application, which require manual manipulation of an inhibitor mechanism prior to the ignition switch being moved to the "Lock" position. These prior art inhibitor mechanisms are not interconnected with the transmission mechanism and therefore do not require that the "Park" mode be preselected prior to actuation of the inhibitor mechansim.

The present invention, through the use of a flexible cable mechanism operatively connected to the inhibitor mechanism, provides an operative connection with the floor mounted transmission control mechanism. In accordance with the present teaching, it is necessary that the operator preselect the "Park" condition prior to actuation of the lock inhibiting mechanism, which mechanism must be actuated prior to the steering column locking mechanism being moved to the "Lock" position.

The preferred embodiment of the present invention utilizes a steering column locking mechanism which requires that the key be rotated to the "Lock" position prior to key removal. Such systems are well-known and have been in use on commercial vehicles for many years.

It is an object of this invention to provide an improved steering column lock inhibitor that has a connection with the floor mounted shift console to ensure that the transmission mechanism is in the "Park" position prior to the inhibitor being actuated.

It is another object of this invention to provide an improved steering column lock inhibitor having a manually actuatable cable, interconnected with a floor mounted transmission shift console, and a pawl engageable with the steering column lock mechanism, whereby the transmission mechanism must be moved to the "Park" position prior to the lock inhibitor being manually moved so that the pawl member will permit the steering column lock mechanism to be locked.

These and other objects and advantages of the present invention will be readily apparent from the following description and drawings in which.

Figure 2:
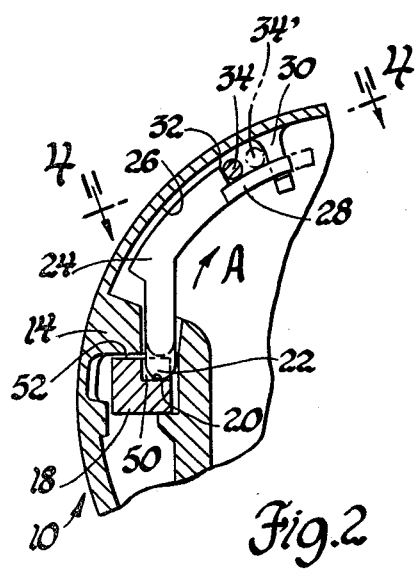
FIG. 2 is a sectional end view showing the pawl mechanism.
Figure 3:
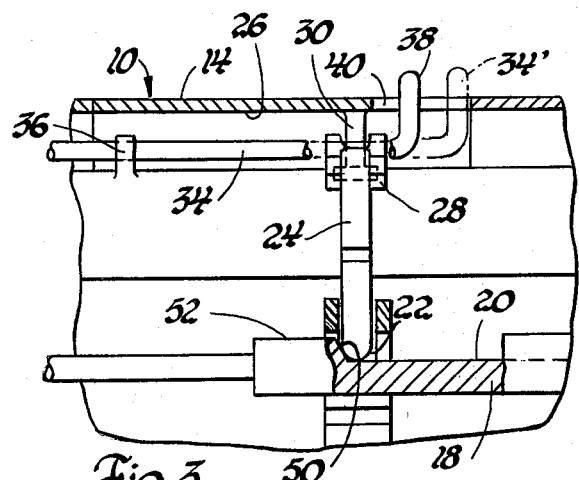
FIG. 3 is a top view of the pawl mechanism.

Referring to the drawings, wherein like characters represent the same or corresponding parts throughout the several views, there is seen a steering column, generally designated 10, and a shift console generally designated 12. The steering column 10 includes a stationary housing 14 in which is included a conventional ignition and steering column locking mechanism 16. This locking mechanism 16 includes a rack gear 18 which may be constructed in accordance with the rack and pinion mechanisms shown in U.S. Pat. No. 3,490,255 issued to Wight et al and assigned to the assignee of the present invention. The rack 18, as seen in FIG. 2, is slidably disposed in the housing 14, and as seen in FIG. 3 has a recess portion 20 which is adapted to receive a rounded nose portion 22 of a pawl member 24. The main body of the pawl member 24 is arcuately shaped and conforms substantially with the inner surface 26 of the housing 14. The end 28 of pawl 24 is bifurcated such that the arms thereof pass on either side of a guide 30 which is formed integrally with the housing 14. There is a shoulder 32 formed on the pawl 24 adjacent the end 28, against which shoulder 32 rests an inhibitor rod 34. The inhibitor rod 34 is guided for sliding movement in a guide member 36 and has a manually operated end 38 which passes through a slot 40 formed in the housing 14 so as to be accessible to the operator. The inhibitor rod 34 has a bent end 42 secured to an end 44 of a flexible cable 46, the other end of which cable 46 is operatively connected to the shift console 12. The shift console 12 can be constructed in accordance with U.S. Ser. No. 002,667, filed Jan. 11, 1979, now U.S. Pat. No. 4,235,123 issued Nov. 25, 1980 in the name of Simancik et al and assigned to the assignee of this application. The console 12 is constructed such that the manual lever 48 must be moved to the "Park" position prior to movement of the cable 44.

Figure 1:
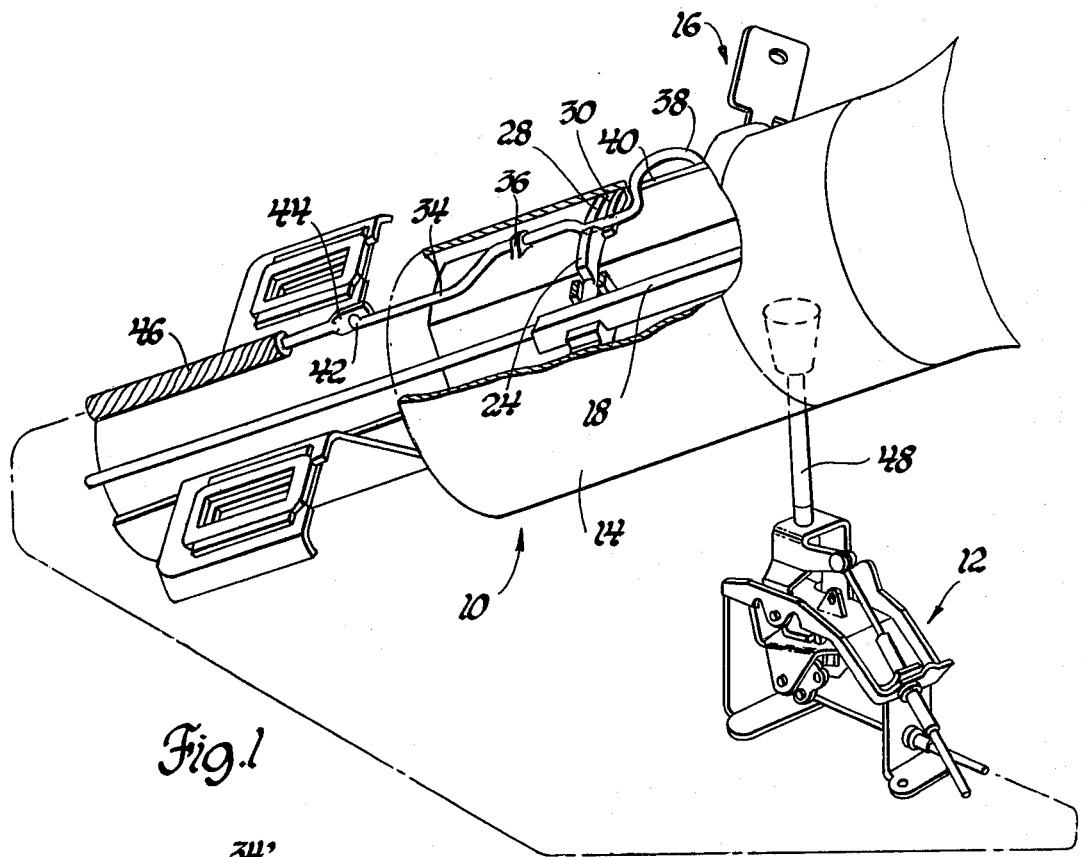
FIG. 1 is a diagrammatic view of a steering column and shift console incorporating the present invention.
Figure 4:
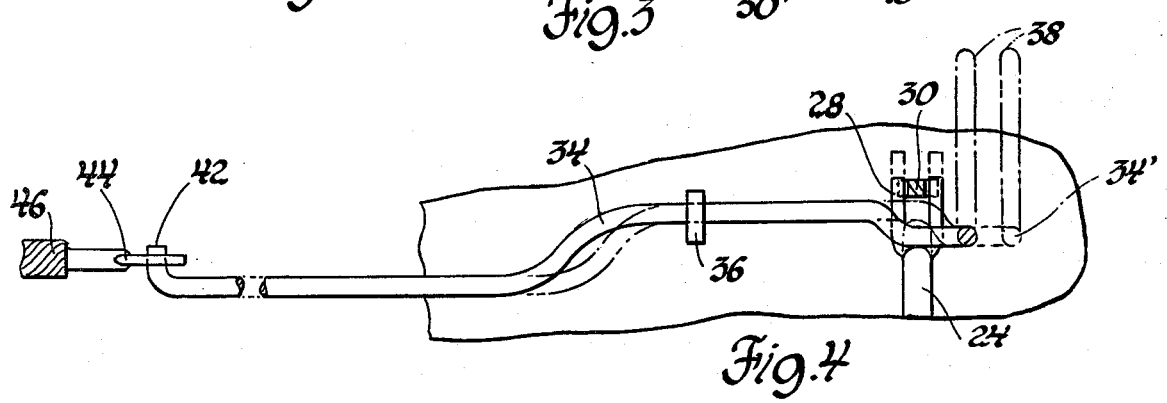
FIG. 4 is a view taken along line 4—4 of FIG. 2.

The normal position of inhibitor rod 34 is shown in FIG. 1 and by solid lines in FIGS. 2, 3 and 4. As can be seen in FIGS. 2 and 4, in the normal position, the inhibitor rod 34 acting on the shoulder 32 forces the pawl 24 into the recess 20 of rack gear 18. When the pawl 24 is so positioned, the ignition or steering column lock mechanism can be manipulated to the "Start", "Run" and "Off" positions, however, the mechanism 16 cannot be moved to the "Lock" position. If the lock inhibitor rod 34 is moved to the phantom line position, shown as 34', the pawl 24 can be moved in the direction of Arrow A shown in FIG. 2. Movement of the pawl 24 in this direction is caused by a ramp 50 formed at one end of the recess 20. Movement of the pawl 24 will occur when the inhibitor rod 34 has been manually moved to the phantom position and the mechanism 16 has been moved to the "Lock" position. Once the pawl has been moved so as to abut the surface 52 of rack 18, the inhibitor rod 34 cannot be returned from the phantom position shown until the steering column locking mechanism 16 is moved from the locked position. Thus, the transmission control mechanism is maintained in the "Park" position whenever the steering column locking mechanism is locked.

The embodiments of the invention in which an exclusive property or privilege is claimed are defined as follows:

1. A steering column lock inhibitor for use in a vehicle having a floor mounted transmission shift mechanism movable to a "Park" position, and an ignition lock mechanism movable to a "Lock" position said lock inhibitor comprising; a rack gear linearly movable by said ignition lock mechanism and having a recess formed therein; a manual rod guided in the steering column for manual linear movement to a locking position; a pawl member responsive to the linear movement of said manual rod and being moved thereby transversely to said rack gear into said recess so that said lock mechanism cannot be moved to the "Lock" position unless said manual rod has been moved to the locking position; means for removing said pawl member from said recess when said lock mechanism is moved to said "Lock" position; and a drive transmitting means operatively connected between the floor mounted transmission shift mechanism and said manual rod for preventing said manual rod from being moved to said locking position until said transmission shift mechanism is moved to the "Park" position.

2. A steering column lock inhibitor for use in a vehicle having a floor mounted transmission shift mechanism movable to a "Park" position, and an ignition lock mechanism movable to a "Lock" position, said lock inhibitor comprising; a rack gear linearly movable by said ignition lock mechanism and having a recess formed therein; a manual lock inhibitor rod guided in the steering column for manual linear movement to a locking position; a pawl member responsive to the linear movement of said manual lock inhibitor rod and being movable transversely to said rack gear into said recess and being maintained therein by said manual lock inhibitor rod so that said lock mechanism cannot be moved to the "Lock" position unless said manual lock inhibitor rod has been moved to the locking position; ramp means on said rack gear for moving said pawl member out of said recess when said lock mechanism is moved to said "Lock" position; and a flexible drive cable operatively connected between the floor mounted transmission shift mechanism and said manual lock inhibitor rod for preventing said manual lock inhibitor rod from being moved to said locking position until said transmission shift mechanism is moved to the "Park" position.

3. A steering column lock inhibitor for use in a vehicle having a floor mounted transmission shift mechanism movable to a "Park" position, and an ignition lock mechanism movable to a "Lock" position, said lock inhibitor comprising; a housing; a rack gear guided in said housing to be linearly movable by said ignition lock mechanism and having a recess formed therein; a manual lock inhibitor rod guided in said housing for manual linear movement to a locking position; a pawl member responsive to the linear movement of said manual lock inhibitor rod and being guided in said housing for arcuate movement transversely to said rack gear and being held in said recess by said manual lock inhibitor rod so that said lock mechanism cannot be moved to the "Lock" position unless said manual rod has been moved to the locking position; ramp means on said rack gear for moving said pawl member out of said recess when said lock mechanism is moved to said "Lock" position; and a flexible drive cable operatively connected between the floor mounted transmission shift mechanism and said manual lock inhibitor rod for preventing said manual lock inhibitor rod from being moved to said locking position until said transmission shift mechanism is moved to the "Park" position.

* * * * *